US012789511B2

(12) United States Patent
Mutha

(10) Patent No.: US 12,789,511 B2
(45) Date of Patent: Nov. 10, 2026

(54) LAMINATED MATERIAL FOR FORMING A FLEXIBLE CONTAINER AND FLEXIBLE TUBE SKIRT COMPRISING SAID LAMINATED MATERIAL

(71) Applicant: ALBEA SERVICES, Gennevilliers (FR)

(72) Inventor: Nitin Mutha, Reims (FR)

(73) Assignee: ALBEA SERVICES, Courbevoie (FR)

( * ) Notice: Subject to any disclaimer, the term of this patent is extended or adjusted under 35 U.S.C. 154(b) by 1288 days.

(21) Appl. No.: 17/608,135

(22) PCT Filed: Mar. 24, 2020

(86) PCT No.: PCT/EP2020/058185
§ 371 (c)(1),
(2) Date: Nov. 1, 2021

(87) PCT Pub. No.: WO2020/193562
PCT Pub. Date: Oct. 1, 2020

(65) Prior Publication Data

US 2022/0212453 A1 Jul. 7, 2022

(30) Foreign Application Priority Data

Mar. 27, 2019 (EP) .................................... 19165660

(51) Int. Cl.
*B32B 27/08* (2006.01)
*B32B 1/08* (2006.01)
(Continued)

(52) U.S. Cl.
CPC ................ *B32B 27/08* (2013.01); *B32B 1/08* (2013.01); *B32B 7/027* (2019.01); *B32B 7/12* (2013.01); *B32B 27/32* (2013.01); *B32B 2250/03* (2013.01); *B32B 2250/242* (2013.01); *B32B 2255/10* (2013.01); *B32B 2255/20* (2013.01);
(Continued)

(58) Field of Classification Search
None
See application file for complete search history.

(56) References Cited

U.S. PATENT DOCUMENTS

2003/0049475 A1* 3/2003 Su ............................ B32B 7/12
428/515
2016/0272389 A1* 9/2016 Wang .................... B32B 27/306
2017/0080669 A1* 3/2017 Jammet .................. B32B 27/30

FOREIGN PATENT DOCUMENTS

DE 4128820 3/1993
JP 2000211627 8/2000

OTHER PUBLICATIONS

Machine translation of JP 2000-211627 A (Year: 2000).*
Correlating Melt Flow Index to Molecular Weight, Cambridge Polymer Group, Sep. 2017 (Year: 2017).*

* cited by examiner

*Primary Examiner* — Ramsey Zacharia
(74) *Attorney, Agent, or Firm* — Morgan, Lewis & Bockius LLP

(57) ABSTRACT

A flexible tube skirt (200) formed by rolling a sheet (100) of a recyclable polypropylene (PP) based laminated material (1), said laminated material (1) comprising an inner layer (10) comprising PP, an outer layer (20) comprising PP and an barrier layer (30) comprising an oxide material barrier (32) and a carrier layer (34) coated by said oxide material barrier (32), said carrier layer (34) being made of PP, the inner layer (10) having an higher ability to flow than the carrier layer (34).

15 Claims, 3 Drawing Sheets

(51) Int. Cl.

| | |
|---|---|
| ***B32B 7/027*** | (2019.01) |
| ***B32B 7/12*** | (2006.01) |
| ***B32B 27/32*** | (2006.01) |

(52) U.S. Cl.

CPC ..... *B32B 2307/31* (2013.01); *B32B 2307/518* (2013.01); *B32B 2307/7242* (2013.01); *B32B 2307/732* (2013.01); *B32B 2439/00* (2013.01)

LAMINATED MATERIAL FOR FORMING A FLEXIBLE CONTAINER AND FLEXIBLE TUBE SKIRT COMPRISING SAID LAMINATED MATERIAL

CROSS-REFERENCE TO RELATED APPLICATIONS

This application is a § 371 national phase entry of International Application No. PCT/EP2020/058185, filed Mar. 24, 2020, which claims priority to European Patent Application No. 19165660.2, filed Mar. 27, 2019.

The invention relates to a laminated material for forming a container, more particularly to a flexible tube skirt comprising said laminated material.

Nowadays, the worldwide plastic production represents one of the biggest waste sources. The recycling of these plastic products is a major concern for national and regional organizations. The non-recycled plastic materials are currently disposed of by a variety of processes from landfill disposal to energy recovery through thermal and chemical treatments.

In the case of cosmetic packaging industry, laminated materials comprising several layers are widely used as they represent advantages in terms of product protection and mechanical properties.

Especially, an aluminium barrier layer is usually used to improve impermeability. Such aluminium layer is firmly bonded to layers of plastic materials. This presents a problem for recycling the laminated materials, as the plastic materials and aluminium cannot be readily separated and sorted into separate recycling channels.

The applicant has hence handled deep studies to replace the aluminium barrier layer by another barrier layer responding to the recycling and the permeability requirements. Oxide materials such as AlOx and SiOx have been found to be promising barrier materials compatible with recycling issues. Such a barrier layer comprises a thin oxide material barrier coated on a polymer carrier layer, especially PP. As a consequence, a major part of the laminate shall be in PP too to allow good recyclability. Indeed, mixing of various plastic material has to be avoided for a good recycling.

However, especially in PP laminate, the bonding values of such barrier layers are not as satisfactory as for an aluminium barrier layer. Low bonding value may cause delamination, in particular in the overlapping region of the tube at the level of the side seam. This may limit the time life of the product contained in a tube.

The present invention attempts to solve at least one of the above mentioned problems and propose a flexible tube skirt formed by rolling a sheet of a recyclable polypropylene (PP) based laminated material, the laminated material comprising an inner layer comprising PP, an outer layer comprising PP and an barrier layer comprising an oxide material barrier and a carrier layer coated by said oxide material barrier, said carrier layer being made of PP, the inner layer having an higher ability to flow than the carrier layer.

The term "recyclable polypropylene (PP) based" means that the percentage in mass of PP in the laminated material is high enough to allow the recycling of said laminated material. In particular, said percentage of PP is at least equal to 95% in mass.

In such laminated material, the applicant discovered that when the inner layer has a better ability to flow than the carrier layer, the sealing is improved especially in the overlapping region when forming a tube skirt from this laminated material. The delamination issues are especially reduced as will be better explained below.

The invention can also comprise any of the following features taken individually or in any technically possible combination:

- the oxide material barrier is made of AlOx,
- the oxide material barrier is made of SiOx,
- the inner layer has a higher melt flow index (MFI) than the MFI of the carrier layer,
- the inner layer has a MFI at least equal to 8 g/10 mn at 230° C. and 2.16 kg according to the ISO 1133 measurement,
- the inner layer has a MFI comprised between 8 and 10 g/10 mn at 230° C. and 2.16 kg according to the ISO 1133 measurement,
- the carrier layer has a MFI comprised between 0.8 and 8 g/10 mn at 230° C. and 2.16 kg according to the ISO 1133 measurement,
- the carrier layer has a MFI comprised between 2 and 4 g/10 mn at 230° C. and 2.16 kg according to the ISO 1133 measurement,
- the inner layer has a lower molecular weight (MW) than the MW of carrier layer,
- the inner layer has a higher molecular weight distribution (MWD) than the MWD of the carrier layer,
- the inner layer is made of PP,
- the outer layer is made of PP,
- the inner layer is made of cast polypropylene (CPP),
- the carrier layer is made of bi-oriented polypropylene (BOPP),
- the inner layer and/or the outer layer comprises a core layer sandwiched by two skin layers,
- the core layer is made of PP,
- the skin layer is made of PP,
- the skin layer is made of PE/PP co-polymer,
- the outer layer comprises a core layer sandwiched by two skin layers,
- the core layer and the skin layers of the outer layer are made of PP,
- the laminated material comprises an adhesive layer between the barrier layer and the inner layer and/or between the barrier layer and the outer layer,
- the adhesive layer is PP based adhesive layer,
- the adhesive layer is polyurethane based adhesive layer, such that a cross link adhesion is made between the barrier layer and the inner layer and/or between the barrier layer and the outer layer,
- the laminated material comprises at least one intermediate layer,
- the intermediate layer is made of PP,
- the ability to flow of the core layer is higher than the ability to flow than the carrier layer,
- the ability to flow of the skin layer is higher than the ability to flow than the carrier layer,
- the ability to flow of the intermediate layer is higher than the ability to flow than the carrier layer,
- the ability to flow of the adhesive layer is higher than the ability to flow than the carrier layer,
- the total thickness of the laminated material is comprised between 150 and 300 μm,
- the total thickness of the laminated material is comprised between 200 and 250 μm,
- the thickness of the inner layer is comprised between 50 and 120 μm,
- the oxide material barrier is oriented toward the inner layer, the laminated material has a substantially symmetrical layering structure from either side of said barrier layer, the flexible tube skirt comprises an overlap side seam made of a first side edge of the sheet covering a second side edge of the sheet.

BRIEF DESCRIPTION OF THE DRAWINGS

The invention will be better understood thanks to the following description which is only indicative and which is not intended to limit said invention, accompanied with the following figures.

In the context of the invention, the following definitions and abbreviations are used.

As used herein, the terms "outer", "inner", "upper" and "lower", and the like, used with respect to the various layers refer to the laminated material with the intended outer or upper surface uppermost and the intended inner or lower (product-contacting) surface lowermost. In addition, these terms and the terms "over", "under" or "on" do not imply that the layers are necessarily directly in contact. For example, the upper layer being "formed on" the barrier layer does not preclude the presence of one or more other intervening layers located between the upper layer and the barrier layer. Furthermore, layers may be provided under the inner layer, i.e. between the inner layer and the product, or above the outer layer (like decorative layers).

The term "container" is used herein to refer to an item which may contain a product. Such products are usually liquids, gels or pastes. Preferred containers include tubes and pouches. The container may further comprise a lid or a cap and, if necessary, attachment means for the lid or cap (such as a tube head or shoulder) before it forms a useful commercial container. As a consequence, the laminated material of the invention can form a tube skirt, an insert of a tube head or a combination thereof.

The term "flexible laminate" as used herein describes a laminate or a container made thereof which can bend or be bent easily and which does not break (unless it is bent too much). Herein in connection with the containers the term flexible indicates that if the container is subjected to a force, for example, by being filled with a liquid, or by applying pressure with a finger or a hand, it will change its form without breaking. A flexible container can also be considered to be a "squeezable" container.

The term "adhesive layer" refers to a layer which is placed between two layers with the object of ensuring that the two layers are joined together.

"SiOx" means silicon oxide which is to say a material containing silicon, oxygen, and optionally other elements, in which x, the ratio of oxygen to silicon atoms, is from about 0.1 to about 2. Preferably, the ratio of oxygen to silicon atoms is from about 0.1 to about 1.2. These alternative values of x apply to any use of the term SiOx in this specification to define a composite barrier coating or layer.

In the same manner, "AlOx" means aluminium oxide which is to say a material containing aluminium, oxygen, and optionally other elements, in which x, the ratio of oxygen to aluminium atoms, is from about 0.1 to about 2. These alternative values of x apply to any use of the term AlOx in this specification to define a composite barrier coating or layer.

The term "polymer" refers to a large molecule, or macromolecule, composed of many repeated subunits.

The term "polyolefin" refers to any of a class of polymers produced from a simple olefin as a monomer.

The term "PP" refers to polypropylene.

Figure 1:
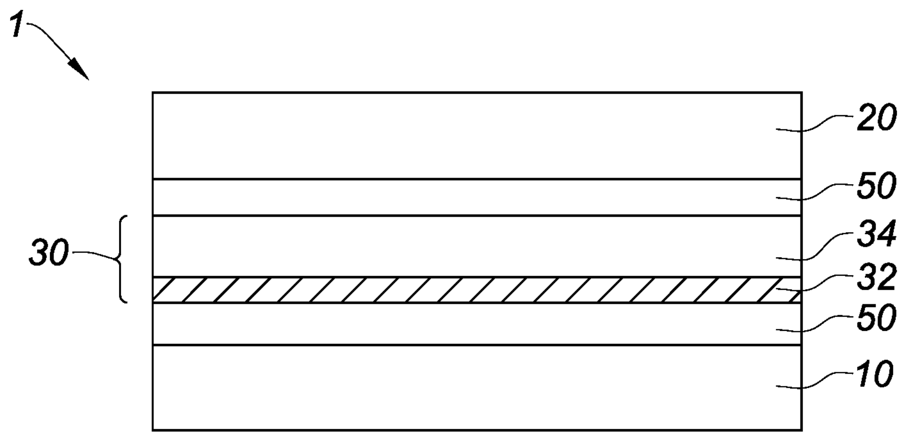
FIG. 1 is a schematic diagram of the layers that form the laminate according to an embodiment of the present invention.
Figure 2:
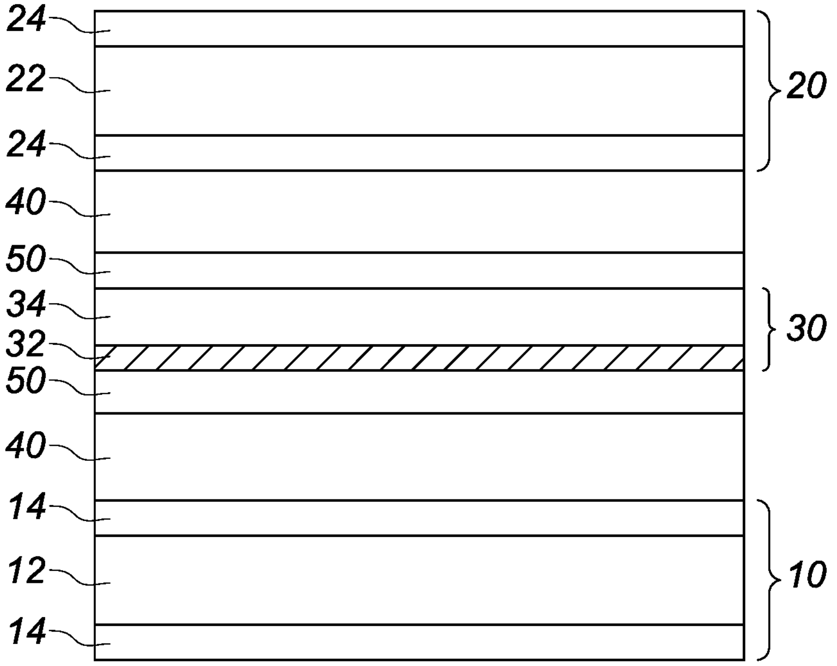
FIG. 2 is a schematic diagram of the layers that form the laminate according to a second embodiment of the present invention.

As illustrated in FIGS. 3 to 6, the present invention relates to a flexible tube skirt 200. Said tube skirt 200 is formed by rolling a sheet 100 of a laminated material 1. Said laminated material 1 is illustrated in FIGS. 1 and 2. The laminated material 1 is a recyclable PP based laminated material. That is to say, a major part of the laminate is made in PP such that the material can be recycled. In particular, the percentage in mass of PP in the laminated material is high enough to allow the recycling of said laminated material. The percentage in mass is for instance calculated by considering the density and the thickness of the measured layer. The density depends on the nature of the layer and is usually known by the man skilled in the art from provider's data sheet. A measurement can also be realized before the lamination process in order to measure each layers separately. The measurement can also be realized after the lamination process, on samples of the laminated material.

Advantageously, the percentage of PP in the laminated material 1 is at least equal to 95% in mass. Such amount of PP in the laminated material allows the recycling of said material.

The laminated material 1 comprises an inner layer 10 comprising PP, an outer layer 20 comprising PP and a barrier layer 30. Said barrier layer 30 comprises an oxide material barrier 32 and a carrier layer 34 coated by said oxide material barrier 32. Said carrier layer 34 is made of PP. According to the invention, the inner layer 10 has a higher ability to flow than the carrier layer 34.

The applicant discovered that when the inner layer has a better ability to flow than the carrier layer, the sealing is improved especially in the overlapping region when forming a tube skirt from this laminated material 1. The delamination issues are especially reduced.

The method for forming the flexible tube skirt 200 comprises the following steps:

winding a flat sheet 100 of laminated material 1 into the form of a sleeve to shape the tube skirt 200;

superimposing a first side edge 102 of the sheet 100 on a second side edge 102' of the sheet 100 to form an overlapping region 110, the sealable inner layer 10 of the first side edge 102 overlapping the sealable outer layer of the second side edge 102';

applying a heating temperature T1 to the inside of the tube skirt 200 at the inner face of the overlapping region to produce the side seam 210 of the tube skirt 200;

simultaneously with the application of the heating temperature T1, applying compression between the outer and inner faces of the overlapping area so as to finalize the side seam of the tube skirt 200.

Figure 4:
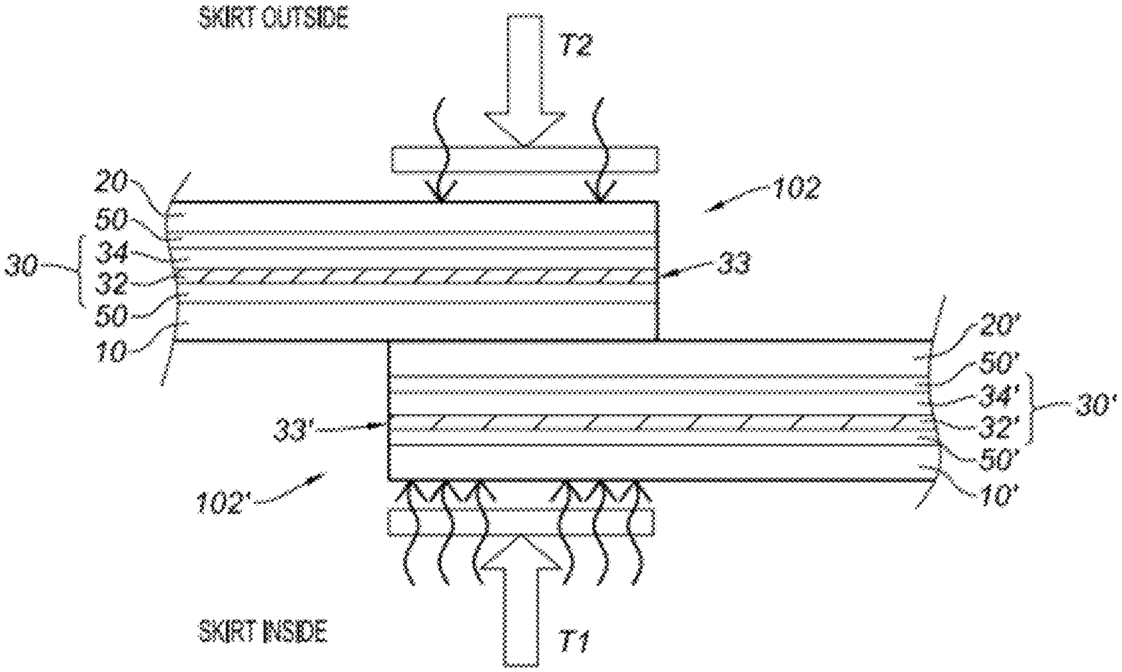
FIG. 4 shows the overlapping region of the tube skirt of FIG. 3 before producing the side seam, according to a first embodiment.
Figure 5:
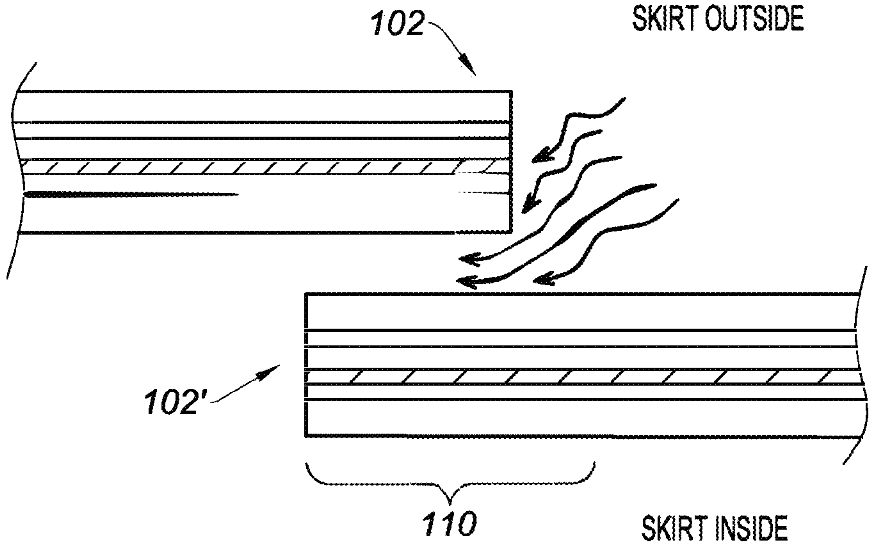
FIG. 5 shows the overlapping region of the tube skirt of FIG. 3 before producing the side seam, according to a second embodiment.
Figure 6:
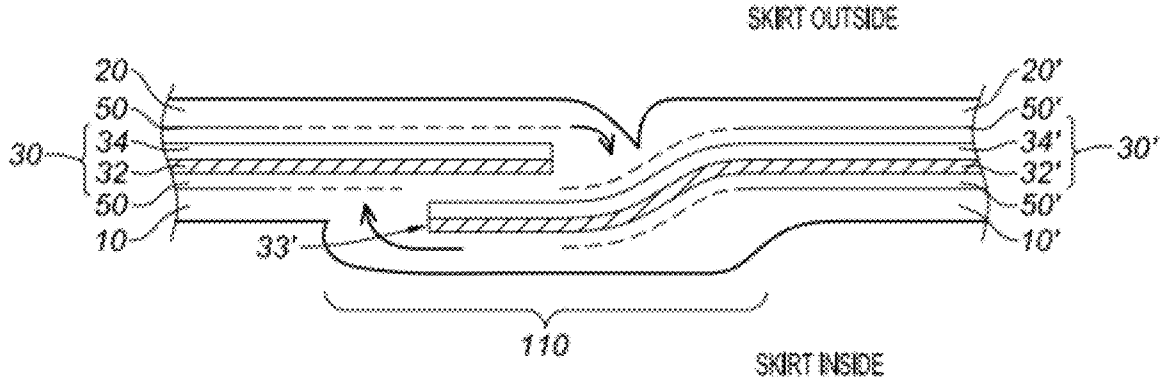
FIG. 6 shows the overlapping region of the tube skirt of FIG. 3 after producing the side seam, for the first and second embodiments.

FIG. 4 precisely shows the overlapping done to form the tube skirt 200, before producing the side seam 210. In this case, a heating temperature T1 (typically comprised between 125° C. and 180° C.) is applied on the inner surface of the tube skirt 200, more specifically on the inner layer 10' of the second side edge 102'.

Advantageously, at the same time, a heating temperature T2, much lower than the heating temperature T1 (typically below 120° C.), is applied on the outer surface of the tube skirt 200, more specifically on the outer layer 20. The heating T2 is represented at the FIG. 4 but is not compulsory to manufacture the tube skirt 200. In a second embodiment represented at FIG. 5, instead of applying a heating temperature T2 on the outer surface of the tube skirt 200, it is possible to preheat the overlapping area 110 by blowing hot air (represented by the arrows) into the interstitial space separating the first side edge 102 from the second side edge 102' before they are superimposed. The goal is to soften the layers beforehand that are intended to melt during the side welding, in particular the layers oriented toward the outside of the tube skirt 200, in order to obtain a weld with a uniform appearance from the outside of the tube skirt. The end result is similar to that of the first embodiment, and corresponds to that shown in FIG. 6.

At the same time as the heating, the overlapping region is compressed at both its outer and inner faces in order to help the melting layers mix and adhere to one another so as to produce the side seam 210 of the tube skirt 200. Concretely, the inner layers 10 and 10', the outer layer 20' and the adhesive layers 50' will melt owing to the heating temperature T1. In the case where the inner layer comprises a plurality of layers, all these layers melt. The melting of the different layers in the overlapping region 110 is represented by the dotted lines and by their gradual disappearance at the FIG. 6.

The cut edges 33 of the oxide material barrier 32 represent a sensitive region of the laminated material 1 which could lead to layers separation (i.e. delamination) if not protected. When forming the side seam 210, it is hence advantageous that some excess material is squeezed out from the inner layer 10' at the level of the overlapping region 110 to form a polymer "flow out" region.

This stability of the barrier layer 30, 30' is due to the significantly low ability to flow of the carrier layer 34 (at least lower than the ability to flow of the inner layer 10, 10').

As the inner layer 10 has a significantly high ability to flow (at least higher than the ability to flow of the carrier layer 34), the PP material from the inner layer, here the inner layer 10' of the second side edge 102', flows (under heat and pressure) in direction to the inner layer 10 of the first side edge 102. This flow of material from the inner layer 10' is represented by a thick arrow at the FIG. 6. Thus, the PP material from the inner layer 10' covers the cut edge 33' of the oxide material barrier 32' and protects it from corrosion by contact with a tube contents. Furthermore, the flow of PP material from the inner layer 10' of the side edge 102' bonds the PP material of the inner layer 10 of the side edge 102 of the sheet 100 as the melting layers mix and adhere to one another. Thus, the sealing of the tube skirt 200 is improved.

To a lesser extent, the outer layer 20 of the first side edge 102 flows in direction to the outer layer 20' of the second side edge 102' under heat and pressure). This flow is also represented by an arrow at FIG. 6. This also improve the sealing of the tube skirt 200.

If the carrier layer 34 flows too much under heating, the coating of oxide material barrier 32 will be stretched and said oxide material barrier 32 will be degraded. This would lead to a defective barrier layer 30 and must be avoided.

Here, said carrier layer 34 and the oxide material barrier 32 do not melt and do not mix with the other layers, thereby making it possible to retain stability in the heated structure. This is particularly visible in FIG. 6, where the deformations of the different layers are shown after producing the side weld. In the overlapping region, the inner layers 10 and 10', the outer layer 20' and the adhesive layers 50' melt owing to the heating temperature T1. This is represented by the dotted lines and by their gradual disappearance. These melted layers mix and adhere to one another. However, it can be seen at FIG. 6 that the carrier layer 34, 34' as well as the oxide material barrier 32, 32' do not melt or flow as they are represented by continuous lines in all the overlapping region 110. It is clearly visible that carrier layer 34 and the oxide material barrier 32 are not mixed with the other layers and are simply deformed under the action of the compression. This stability of the barrier layer 30, 30' is due to the significantly low ability to flow of the carrier layer 34 (at least lower than the ability to flow of the inner layer 10, 10'). The layers upstream from, downstream from, and between the barrier layers 30, 30' have been mixed and fused.

Therefore, when the inner layer 10 has a better ability to flow than the carrier layer 34, the oxide material barrier 32 stays stable, the cut edge 33 is protected and the sealing is improved especially in the overlapping region 110.

Oxide material barriers are particularly interesting in recyclable laminated materials as they have good barrier properties while having a very low thickness and thus represent a small amount of the laminated material. Indeed, the carrier layer 34 represents most of the thickness of the barrier layer 30 as the oxide material is advantageously a thin layer coated on the carrier layer 34. This small amount of oxide material has no impact on the recycling stream and thus the laminated material can be recycled as a whole, with the barrier layer 30.

Preferably, the barrier layer 30 comprising said carrier layer 34 and said oxide material 32 coating has a thickness between 10 and 35 μm. More preferably, the barrier layer 30 has a thickness between 15 and 25 μm.

Different oxide material barrier can be used in the context of the invention. According to an embodiment, the oxide material 32 is made of SiOx. Advantageously, a thin inorganic layer of silicon oxide is evaporated in a vacuum environment to a PP carrier layer 34 substrate.

According to another embodiment, the oxide material 32 is made of AlOx.

Advantageously, the coating of oxide material 32 has a thickness less than 0.1 μm.

The ability to flow of the different layers of the laminated material 1 can be influenced by different features.

A first of these features is the Melt Flow Index (MFI) or melt flow rate. The MFI is a measure of the ease of flow of the melt of a thermoplastic polymer. It is defined as the mass of polymer, in grams, flowing in ten minutes through a capillary of a specific diameter and length by a pressure applied via prescribed alternative gravimetric weights for alternative prescribed temperatures. The method is described in the similar standards ASTM D1238 and ISO 1133. Here, the sample has been tested at 230° C. and 2.16 kg.

Preferably, the inner layer 10 has a higher MFI than the MFI of the carrier layer 34. In such case, in particular when forming the side seam, the inner layer 10 will better flow than the carrier layer 34. This implies the advantages described above.

Advantageously, the inner layer 10 has a MFI at least equal to 8 g/10 mn at 230° C. and 2.16 kg according to the ISO 1133 measurement. More advantageously, the inner layer 10 has a MFI comprised between 8 and 10 g/10 mn. An inner layer 10 having such MFI presents a good ability to flow. Thus, the covering of the edges of the oxide material barrier is ensured and the sealing of the side seam is improved.

Preferably, the carrier layer 34 has a MFI comprised between 0.8 and 8 g/10 mn at 230° C. and 2.16 kg. More preferably, the carrier layer 34 has a MFI comprised between 2 and 4 g/10 mn at 230° C. and 2.16 kg. This limits the movement of the carrier layer 34, protects the oxide material barrier and thus ensures a sustainable barrier layer 30.

Another feature of the PP layers influencing their ability to flow is the molecular weight (MW). Molecular weight is the mass of a molecule. It is calculated as the sum of the relative atomic masses of each constituent element multiplied by the number of atoms of that element in the molecular formula. The MW is usually communicated in the data sheet of the products. Melt flow index is an indirect measure of molecular weight, with high melt flow index generally corresponding to low molecular weight.

Advantageously, the inner layer 10 has a lower MW than the MW of the carrier layer 34. Thus, the inner layer can flow more easily than the carrier layer, which involves the advantages enounced above.

Another feature of the PP layers that influences their ability to flow is the molecular weight Distribution (MWD). This characteristic is intrinsically related to the molecular weight. In linear polymers the individual polymer chains rarely have exactly the same degree of polymerization and molar mass, and there is always a distribution around an average value. The molecular weight distribution (or molar mass distribution) describes the relationship between the number of moles of each polymer species and the molar mass of that species.

Advantageously, the inner layer 10 has a lower MWD than the MWD of the carrier layer 34. Thus, the inner layer can flow more easily than the carrier layer, which involves the advantages enounced above.

As illustrated in FIG. 1, the barrier layer 30 is located between the inner layer 10 and the outer layer 20.

Said inner layer 10 can be composed by a plurality of single layers. In the same way, said outer layer 20 can be composed by a plurality of single layers. The number of single layers composing the inner layer 10 and the outer layer 20 is not limited to the example illustrated in the figures.

Advantageously, the inner layer 10 comprises a core layer 12 sandwiched by two skin layers 14. The core layer 12 and the skin layers 14 comprise PP. More advantageously, the core layer is made of PP and the skin layers are PP/PE copolymer. Said PP/PE copolymer comprises less than 15% in mass of PE. Advantageously, the PP/PE copolymer comprises between 6% and 14% in mass of PE. In any case, PP material represents at least 95% in mass of the laminated material 1. The use of a PP/PE copolymer improve the heat sealing properties.

In the same way, the outer layer advantageously comprises a core layer 22 sandwiched by two skin layers 24. The core layer 22 and the skin layers 24 comprise PP. More advantageously, the core layer is made of PP and the skin layers are PP/PE copolymer. Said PP/PE copolymer comprises less than 15% in mass of PE. Advantageously, the PP/PE copolymer comprises between 6% and 14% in mass of PE. In any case, PP material represents at least 95% in mass of the laminated material 1. The use of a PP/PE copolymer improve the heat sealing properties.

Alternatively, the inner layer 10 can be made of PP. In the same way, the outer layer 20 can be made of PP. These full PP layers allows a better recyclability of the laminated material as is comprises a higher PP % in mass.

The different single PP layers can be cast type films or blown type film.

The different layers are joined together by lamination process in order to obtain the laminated material according to the invention. Said laminated material can be obtained by different lamination process, as extrusion lamination process or adhesive lamination process.

Advantageously, the inner layer 10 is made of cast polypropylene (CPP). The type of PP used to form CPP layer is particularly advantageous for forming the inner layer 10 as it presents a sensibly high melt flow index and thus a good ability to flow. As exposed above, when the inner layer 10 has a good ability to flow, some excess material is squeezed out from the overlapping region 110 to form a polymer "flow out" region which protects the cut edge 33 of the oxide material barrier 32 from corrosion by contact with a tube contents.

More advantageously, the carrier layer 34 is made of bi-oriented polypropylene (BOPP). The type of PP used to form BOPP layer is particularly advantageous for forming the carrier layer 34 as it presents a sensibly low melt flow index and thus a low ability to flow. As exposed above, when the carrier layer has a sensibly low melt flow index the oxide material barrier 32 stays stable, the cut edge 33 is protected and the sealing is improved especially in the overlapping region. Furthermore, BOPP presents a higher resistance to heat than the CPP. Said resistance to heat allows protecting the barrier coating during the lamination process.

Preferably, the laminated material 1 comprises an adhesive layer 50 between the barrier layer 30 and the inner layer 10 and/or between the barrier layer 30 and the outer layer 20. Said adhesive layer 50 is used to connect the inner layer 10 and barrier layer 30 as well as the outer layer 20 and the barrier layer 30 and to prevent any delamination problems. The adhesive layer may be PP based. Advantageously, the adhesive layer 50 is polyurethane (PU) based adhesive layer, such that a cross link adhesion is made between the barrier layer 30 and the inner layer 10 and/or between the barrier layer 30 and the outer layer 20. A cross link adhesion results in a better adhesion between the layers and thus prevents the delamination issues.

Advantageously, the laminated material comprises at least one intermediate layer 40. This intermediate layer 40 can be located between the inner layer 10 and the barrier layer 30 and/or between the outer layer 20 and the barrier layer 30. The intermediate layer 40 comprises PP. Preferably, said intermediate layer 40 is made of PP. Advantageously, said intermediate layer 40 is a CPP layer.

The total thickness of the laminated material 1 is an important feature as it will influence its mechanical properties. The laminated material 1 comprising mostly PP presents better mechanical strength than other comparative structures such as polyethylene (PE) structures. In particular, the laminated material 1 according to the invention has an increased stiffness and rebound than other comparative PE structures. The rebound is the ability of the material to regain its original shape after that a deforming force being released. The advantage of a laminated structure having increased stiffness and rebound is that the target stiffness may be obtained by reducing the thickness and thus saving material. The target stiffness/rebound depends on the application, in particular on the type of container formed by the laminated material 1 and the type of product contained therein.

Advantageously, the total thickness of the laminated material 1 is comprised between 150 and 300 μm. More advantageously, the total thickness of the laminated material 1 is comprised between 200 and 250 μm. Such thickness is well adapted for forming flexible tube, in particular toothpaste tube.

Another feature that can influence the ability of the different layers to flow is the thickness of the laminated material 1 and the respective thickness of the different layers. In order to flow, the inner layer 10 require a minimum thickness. If the inner layer 10 is too thin, not enough material will be “available” to flow and the covering of the cut edges 33 of the oxide material barrier 32 won't be achieved.

The thickness of the inner layer also influences the absorption of some products that will be contained in the container. Some part of the product that will be contained in the container, for example the flavors, can be absorbed by the layers placed between the product and the barrier 32, here the inner layer 10. If the inner layer 10 is too thick, the retention rate will be too high and might lead to a deterioration of said inner layer 10. Thus, there is a need for a compromise between retention rate requiring a low thickness and appropriate flow requiring a high thickness.

Advantageously, the thickness of the inner layer (10) is comprised between 50 and 120 μm. More advantageously, the thickness of the inner layer 10 is around 80 μm.

It has to be noticed that the FIGS. 1 to 6 are schematic representation and that the layers are not at scale.

In order to further limit the absorption rate of the laminated material 1 the oxide material barrier 32 can be carried by carrier layer 34 on its side facing the inner layer 10. In other words, the metal oxide barrier 32 of the barrier layer 30 is oriented toward the inner layer 10. This configuration of the barrier layer 30 allows stopping the migration of part of the product that will be contained in the container before it reaches the carrier layer 34 and thus it reduces the absorption rate.

Advantageously, the laminated material 1 having a substantially symmetrical layering structure from either side of said barrier layer 30. The symmetry of the laminated material can influence some physical properties of the laminated material. In particular, the symmetry improves the roundness of the skirt 200 made thereby. The roundness of the tube allows increasing production rates when forming and filling tubes.

The following structures are exemplary embodiments of laminated materials according to the present invention. The invention is not restricted to the specific laminated material of the exemplary embodiments but encompasses other laminated material structures falling within the scope of the appended claims.

The different layers of these exemplary embodiments of laminated material are described starting from the external layer, i.e. the intended outer surface uppermost, to the internal layer, i.e. the intended inner (product-contacting) surface lowermost.

Embodiment 1

This embodiment is schematically represented at FIG. 1. Said embodiment is constituted of:

an outer layer 20 made of CPP,
a first adhesive layer 50,
a carrier layer 34 made of BOPP,
an oxide material barrier 32 made of SiOx,
a second adhesive layer 50,
an inner layer 10 made of CPP.

The laminated material 1 is obtained from these different layers by adhesive lamination. The outer layer 20 has a thickness of 100 μm. The carrier layer 34 and the oxide material barrier 32 represent the barrier layer 30. The SiOx barrier 32 has a thickness less than 0.1 μm. Said barrier layer has a thickness of 20 μm. The inner layer 10 has a thickness of 100 μm. The laminated material 1 has a total thickness of 228 μm.

Embodiment 2

Said embodiment is constituted of:

a skin layer 24 made of CPP,
a core layer 22 made of CPP,
a skin layer 24 made of CPP,
a first adhesive layer 50,
a carrier layer 34 made of BOPP,
an oxide material barrier 32 made of SiOx,
a second adhesive layer 50,
a skin layer 14 made of CPP,
a core layer 12 made of CPP,
a skin layer 14 made of CPP The laminated material 1 is obtained from these different layers by extrusion lamination. The skin layers 24 and the core layer 22 represent the outer layer 20. The skin layers 24 each have a thickness of 10 μm and the core layer 22 has a thickness of 80 μm. Thus, the outer layer 20 has a thickness of 100 μm. The carrier layer 34 and the oxide material barrier 32 represent the barrier layer 30. The SiOx barrier 32 has a thickness less than 0.1 μm. Said barrier layer has a thickness of 18 μm. The skin layers 14 and the core layer 12 represent the inner layer 10. The skin layers 14 each have a thickness of 10 μm and the core layer 12 has a thickness of 80 μm. Thus, the inner layer 10 has a thickness of 100 μm. The laminated material 1 has a total thickness of 226 μm.

Embodiment 3

This embodiment is schematically represented at FIG. 1. Said embodiment is constituted of:

an outer layer 20 made of CPP,
a first adhesive layer 50,
a carrier layer 34 made of BOPP,
an oxide material barrier 32 made of AlOx,
a second adhesive layer 50,
an inner layer 10 made of CPP.

The laminated material 1 is obtained from these different layers by extrusion lamination. The outer layer 20 has a thickness of 100 μm. The carrier layer 34 and the oxide material barrier 32 represent the barrier layer 30. The AlOx barrier 32 has a thickness less than 0.1 μm. Said barrier layer has a thickness of 16 μm. The inner layer 10 has a thickness of 100 μm. The laminated material 1 has a total thickness of 224 μm.

Embodiment 4

This embodiment is schematically represented at FIG. 2. This embodiment is constituted of:

a skin layer 24 made of PP/PE copolymer,
a core layer 22 made of CPP,
a skin layer 24 made of PP/PE copolymer,
a first intermediate layer 40 made of PP
a first adhesive layer 50, a carrier layer 34 made of BOPP,
an oxide material barrier 32 made of AlOx,
a second adhesive layer 50,
a second intermediate layer 40 made of PP,
a skin layer 14 made of PP/PE copolymer,
a core layer 12 made of CPP,
a skin layer 14 made of PP/PE copolymer.

The laminated material 1 is obtained from these different layers by extrusion lamination. The skin layers 24 and the core layer 22 represent the outer layer 20. The skin layers 24 each have a thickness of at most 15 μm and the core layer 22 has a thickness of 30 to 100 μm. The outer layer 20 has a thickness of 60 to 120 μm.

The outer layer 20 has a thickness of 60 to 120 μm. The first and the second intermediate layer 40 have a thickness of 30 μm. The carrier layer 34 and the oxide material barrier 32 represent the barrier layer 30. The AlOx barrier 32 has a thickness less than 0.1 μm. Said barrier layer has a thickness of 16 μm. The skin layers 14 and the core layer 12 represent the inner layer 10. The skin layers 14 each have a thickness of at most 15 μm and the core layer 12 has a thickness of 30 to 100 μm. The inner layer 10 has a thickness of 60 to 120 μm. The laminated material 1 has a total thickness of 200 to 250 μm.

Embodiment 5

This embodiment is constituted of:
a skin layer 24 made of PP/PE copolymer,
a core layer 22 made of CPP,
a skin layer 24 made of PP/PE copolymer,
an intermediate layer 40 made of PP
a first adhesive layer 50,
a carrier layer 34 made of BOPP,
an oxide material barrier 32 made of AlOx,
a second adhesive layer 50,
an inner layer 10 made of CPP.

The laminated material 1 is obtained from these different layers by extrusion lamination. The skin layers 24 and the core layer 22 represent the outer layer 20. The skin layers 24 each have a thickness of at most 15 μm and the core layer 22 has a thickness of 30 to 100 μm. Thus, the outer layer 20 has a thickness of 60 to 120 μm. The first and the second intermediate layer 40 have a thickness of 30 μm. The carrier layer 34 and the oxide material barrier 32 represent the barrier layer 30. The AlOx barrier 32 has a thickness less than 0.1 μm. Said barrier layer has a thickness of 16 μm. The inner layer 10 has a thickness of 70 to 120 μm. The laminated material 1 has a total thickness of 200 to 250 μm.

In all the embodiments presented above, the percentage of PP in the laminated material 1 is at least equal to 95% in mass such that the laminated material is recyclable. Furthermore, in all these embodiments, the ability to flow of the inner layer 10 is higher than the ability to flow than the carrier layer 34. Advantageously, the ability to flow of the core layer 12 the skin layers 14, the intermediate layers 40 and the adhesive layers 50 is also higher than the ability to flow than the carrier layer 34. Thus, when forming a tube skirt 200 from the laminated material 1, the oxide material barrier 32 stays stable, the cut edge 33 is protected and the sealing is improved in the overlapping region.

Figure 3:
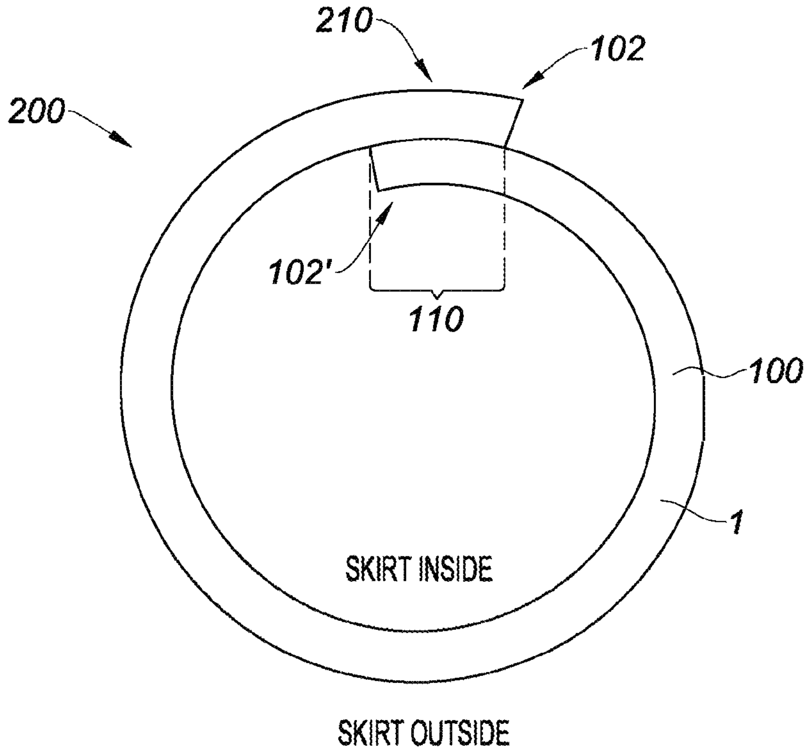
FIG. 3 is a cross-sectional view of a tube skirt according to the present invention.

As illustrated in FIG. 3, the tube skirt 200 is formed by rolling a sheet 100, especially a flat sheet 100, of a laminated material 1 as described above. More particularly, portions of the sheet 100 are folded onto each other in a tubular configuration such that a first side edge 102 of the sheet 100 covers a second side edge 102' of the sheet 100. Then, an upper surface of the outer layer 20' is in facing contact with a lower surface of the inner layer 10. An overlap side seam 210 is formed by means of heating the sheet 100 such that the upper surface of the outer layer 20' is bonded to the lower surface of the inner layer 10.

Said flexible tube skirt 200 is intended to be fixed to a tube head in order to form a flexible tube. The tube head is overmoulded on the skirt. Said tube head comprises a shoulder and a neck. The skirt is fixed to the shoulder periphery. Said tube head is advantageously made of PP but can be made in any other suitable material such as PE.

As the inner layer 10 has a good ability to flow, when the side seam 210 is formed, the inner layer 10 flows and cover the cut edge 33 of the oxide material barrier 32. Thus, the cut edge is protected from the product that will be contained by the tube and the sealing is improved especially in the overlapping region 110. Furthermore, as the carrier layer 34 doesn't flow, or at least not much, when the side seam 210 is formed, the oxide material barrier 32 stays stable and a sustainable protection is ensured. Thus, the sealing of the tube skirt 200 is improved and the time life of a product contained in a tube comprising said tube skirt 200 is extended.

The invention claimed is:

1. A flexible tube skirt formed by rolling a sheet of a recyclable polypropylene (PP) based laminated material, said laminated material comprising an inner layer comprising PP, an outer layer comprising PP and a barrier layer comprising an oxide material barrier and a carrier layer coated by said oxide material barrier, said carrier layer being made of PP, the inner layer having an higher ability to flow than the carrier layer, and a percentage of PP in the laminated material being at least equal to 95% in mass.

2. The flexible tube skirt according to claim 1, wherein the oxide material barrier is made of AlOx.

3. The flexible tube skirt according to claim 1, wherein the oxide material barrier is made of SiOx.

4. The flexible tube skirt according to claim 1, wherein the inner layer has a higher melt flow index (MFI) than the MFI of the carrier layer.

5. The flexible tube skirt according to claim 4, wherein the inner layer has a MFI at least equal to 8 g/10 mn at 230° C. and 2.16 kg according to the ISO 1133 measurement.

6. The flexible tube skirt according to claim 4, wherein the carrier layer has a MFI comprised between 2 and 4 g/10 mn at 230° C. and 2.16 kg according to the ISO 1133 measurement.

7. The flexible tube skirt according to claim 1, wherein the inner layer has a lower molecular weight (MW) than the MW of the carrier layer.

8. The flexible tube skirt according to claim 1, wherein the inner layer and the outer layer are made of PP.

9. The flexible tube skirt according to claim 1, wherein the inner layer is made of cast polypropylene (CPP) and the carrier layer is made of bi-oriented polypropylene (BOPP).

10. The flexible tube skirt according to claim 1, comprising an adhesive layer between the barrier layer and the inner layer and/or between the barrier layer and the outer layer.

11. The flexible tube skirt according to claim 10, wherein the adhesive layer is polyurethane (PU) based adhesive layer, such that a cross link adhesion is made between the barrier layer and the inner layer and/or between the barrier layer and the outer layer.

12. The flexible tube skirt according to claim 1, wherein the total thickness of the laminated material is comprised between 200 and 250 μm and the thickness of the inner layer is comprised between 50 and 120 μm.

13. The flexible tube skirt according to claim 1, wherein the oxide material barrier is oriented toward the inner layer.

14. The flexible tube skirt according to claim 1, wherein said laminated material has a substantially symmetrical layering structure from either side of said barrier layer.

15. The flexible tube skirt according to claim 1, comprising an overlap side seam made of a first side edge of the sheet covering a second side edge of the sheet.

* * * * *